United States Patent
McAndrew

(10) Patent No.: US 11,661,961 B2
(45) Date of Patent: May 30, 2023

(54) BRACKET FOR REFRIGERATOR AEROFOILS

(71) Applicant: Aerofoil Energy Limited, Macclesfield (GB)

(72) Inventor: Paul McAndrew, Macclesfield (GB)

(73) Assignee: Aerofoil Energy Limited, Macclesfield (GB)

(*) Notice: Subject to any disclaimer, the term of this patent is extended or adjusted under 35 U.S.C. 154(b) by 64 days.

(21) Appl. No.: 17/274,641

(22) PCT Filed: Sep. 9, 2019

(86) PCT No.: PCT/GB2019/052503
§ 371 (c)(1),
(2) Date: Mar. 9, 2021

(87) PCT Pub. No.: WO2020/053562
PCT Pub. Date: Mar. 19, 2020

(65) Prior Publication Data
US 2021/0337985 A1    Nov. 4, 2021

(30) Foreign Application Priority Data

Sep. 11, 2018 (GB) ..................... 1814715

(51) Int. Cl.
*F16M 11/00* (2006.01)
*F16B 2/06* (2006.01)
*A47F 3/04* (2006.01)

(52) U.S. Cl.
CPC ............ *F16B 2/065* (2013.01); *A47F 3/0486* (2013.01)

(58) Field of Classification Search
CPC ...... F16B 2/065; A47F 3/0486; A47F 3/0447; A47F 3/0469; F25D 23/023
See application file for complete search history.

(56) References Cited

U.S. PATENT DOCUMENTS

| 3,949,880 A | 4/1976 | Fortunato |
| 4,307,864 A | 12/1981 | Benoit |

(Continued)

FOREIGN PATENT DOCUMENTS

| DE | 10315915 A1 | 11/2004 |
| DE | 202011107543 U1 | 2/2012 |

(Continued)

OTHER PUBLICATIONS

OESS Lab Clamp 3 Prong Finger Style Rubber-Coated Head A Black Laboratory Stand Clip, https://www.amazon.com/OESS-Clamp-Finger-Rubber-Coated-Laboratory/dp/B071D38HSY, Accessed by UK Intellectual Property Office on Mar. 7, 2019, 6 pages.

(Continued)

*Primary Examiner* — Amy J. Sterling
(74) *Attorney, Agent, or Firm* — Quarles & Brady LLP

(57) ABSTRACT

A bracket for clamping an aerofoil to a shelf of a refrigerator is described. The bracket comprises a mounting portion for holding part of an aerofoil in use, an upper jaw configured to engage the forward lip of shelf and a lower jaw member configured to engage a lower lip on the underside of refrigerator shelf. The bracket may also comprise clamping means configured to enable the upper jaw member and the lower jaw members to be drawn towards one another to clamp the bracket on the refrigerator shelf.

9 Claims, 8 Drawing Sheets

(56) References Cited

U.S. PATENT DOCUMENTS

| | | | |
|---|---|---|---|
| 5,237,767 A | | 8/1993 | Kringel et al. |
| 7,513,637 B2* | | 4/2009 | Kelly ................. F25D 27/00 |
| | | | 362/125 |
| 7,669,556 B2* | | 3/2010 | Reusche ............ A01K 1/035 |
| | | | 119/485 |
| 7,824,055 B2* | | 11/2010 | Sherman ............ A47F 11/10 |
| | | | 362/127 |
| 8,128,251 B2* | | 3/2012 | Huang ............... G09F 3/204 |
| | | | 362/125 |
| 9,149,119 B2* | | 10/2015 | Hansel ............... A47B 96/021 |
| 10,405,678 B1* | | 9/2019 | DeSena ............. A47F 5/0869 |
| 10,765,231 B2* | | 9/2020 | Eget ................... F25D 23/023 |
| 2016/0091177 A1* | | 3/2016 | Houle ................. A47F 3/001 |
| | | | 362/133 |
| 2019/0142186 A1 | | 5/2019 | Wirth |

FOREIGN PATENT DOCUMENTS

| | | |
|---|---|---|
| DE | 102015220353 A1 | 4/2017 |
| GB | 2519463 B | 8/2016 |
| GB | 2563407 A | 12/2018 |
| GB | 2567020 A | 4/2019 |
| JP | 2010207565 A | 9/2010 |
| WO | 0125577 A2 | 4/2001 |
| WO | 2008052721 A1 | 5/2008 |

OTHER PUBLICATIONS

PCT International Search Report and Written Opinion, PCT/GB2019/052503, dated Nov. 13, 2019, 11 pages.

* cited by examiner

BRACKET FOR REFRIGERATOR AEROFOILS

This application represents the U.S. national stage entry of International Application No. PCT/GB2019/052503 filed Sep. 9, 2019, which claims priority to United Kingdom Patent Application No. 1814715.7 filed Sep. 11, 2018, the disclosures of which are incorporated herein by reference in their entirety and for all purposes.

The present invention relates to a bracket for clamping an aerofoil to a shelf of a refrigerator, and relates particularly, but not exclusively, to brackets that clamp to the front edge of a refrigerator shelf for the purpose of holding an aerofoil to direct an air curtain to increase energy efficiency.

Open-fronted refrigerators are used in retail environments to provide easy access to chilled goods for consumers. Rather than using doors to maintain cold temperatures, an air curtain is used which is blown through an egress at the top of a refrigerator towards an ingress at the bottom of the refrigerator. However, such refrigerators generally require more energy than refrigerators with doors as a result of the cold air curtain mixing with warm air outside the front of the refrigerator.

An apparatus for increasing the energy efficiency of such open-fronted refrigerators is described in GB2519463B. The system described uses aerofoils attached to one or more shelves of the fridge as shown in FIGS. 1 and 3. Refrigerator 2 comprises a housing 4 and several shelves 6 disposed in the housing 4 to display chilled goods. An egress 8 at the top of the housing 4 is arranged to blow a stream of cold air known as an air curtain downwardly. An ingress 10 at the base of the housing 4 draws in the bottom of the cold air curtain for re-circulation.

To reduce the amount of cold air that spills out of the front of the refrigerator to mix with warm air, an aerofoil 12 is attached to the front 14 of each shelf 6 by means of a bracket 16. The action of aerofoils 12 to retain the air curtain at the front of refrigerator 4 and reduce spillage of cold air out of the refrigerator is discussed in further detail in GB2519463B and will not be described in any further detail herein.

Referring to FIGS. 2 and 3, bracket 16 for holding an edge of an aerofoil 12 comprises a hook portion 18 arranged to fit over shelf support 20 which forms the edge of one of the refrigerator shelves 6. The bracket also comprises an arm 22 extending forwardly of the shelf 6 when the bracket 16 is mounted over the shelf support 20. At the end of the arm 22, two projections 24a and 24b define a channel 26 in which an end of aerofoil 12 sits.

Bracket 16 suffers from the drawback that it can only be used if the refrigerator shelves 6 are of the type that have upright shelf supports 20. In many refrigerators, these shelf supports 20 either are not used or are not readily accessible.

For example, referring to FIG. 4 a shelf 30 is shown which comprises an upwardly extending lip 32 at its front end. A sheet of glass or acrylic glass 34 is laid on the shelf 30 and forms the surface on which chilled goods are held for display.

Referring to FIG. 5, a known clamp 36 used on such a shelf comprises a jaw 38 which extends over lip 32 and clamps down on acrylic glass sheet 34 by means of a screw 40. However, clamp 36 suffers from the drawback that clamping the acrylic glass sheet 34 to the shelf prevents easy removal of acrylic glass sheet 34 for replacement or cleaning. The clamp 36 can also damage acrylic glass sheet 34 by engagement.

GB2563407 describes a bracket for holding a refrigerator aerofoil. The bracket comprises several parts which are screwed together to grip various configurations of refrigerator shelf. The brackets described suffer from the drawback that they are formed from several parts which must be screwed together. This can be an awkward operation meaning that parts might be dropped when attempting to connect multiple pieces together to grip a refrigerator shelf. The brackets described also suffer from the drawback that the screws used to grip the shelves contact the shelves directly which can cause damage to the shelf from over-tightening.

Preferred embodiments of the present invention seek to overcome the above disadvantages of the prior art.

According to the present invention, there is provided a bracket for clamping an aerofoil to a shelf of a refrigerator, the bracket comprising:

an arm portion for supporting a mounting portion for holding part of an aerofoil in use, wherein the arm portion bifurcates into an upper arm and a lower arm defining an elongate channel therebetween, the elongate channel permitting the upper and lower arms to move towards and away from one another;

an upper jaw member formed at an end of the upper arm, the upper jaw member defining a recess to receive the forward lip of a refrigerator shelf in use; and a lower jaw member formed at an end of the lower arm, the lower jaw member configured to engage an underside of said refrigerator shelf or a lower lip of said refrigerator shelf.

This provides the advantage of a bracket for clamping an aerofoil to a shelf of a refrigerator that can be rigidly attached to several different types of refrigerator shelf without risk of damaging the refrigerator shelf.

This also provides the advantage of a bracket that can be attached to several different types of shelf and in particular, refrigerator shelves which have inaccessible sides.

Furthermore, this provides the advantage that by having jaws formed at the ends of upper and lower parallel arms which have an elongate channel disposed therebetween, the arms can move relative to one another in and out of the channel to enable the jaws to move to facilitate clamping on a refrigerator shelf. It has been found that when this configuration of arms is used, no further clamping means is necessary to mount the bracket to a shelf.

In addition, the arm portion bifurcating into upper and lower arms means that the bracket can be formed from a single piece of moulded material which prevents the user having to awkwardly attach several different parts together onto a refrigerator shelf.

In preferred embodiment the upper arm and lower arm are formed from a resilient material to facilitate flexing of the upper and lower arms to enable the upper and lower jaw members to be snap-fit onto said refrigerator shelf in use.

This provides the advantage of a very straightforward way for a user to mount the bracket to a refrigerator shelf.

In a preferred embodiment, the upper arm and lower arm defining the elongate channel between substantially parallel surfaces of the upper arm and lower arm.

In a preferred embodiment, the bracket is formed from a single piece of thermoplastic.

This provides the advantage of a straightforward means of manufacture which produces a bracket with advantageous resilient properties.

In a preferred embodiment, the bracket further comprises clamping means configured to enable the upper and lower arms to be drawn towards one another to clamp the bracket on said refrigerator shelf.

This provide the advantage of an additional clamping force if required, and can also prevent vibration of the bracket.

In a preferred embodiment, the clamping means makes no contact with said refrigerator shelf.

This provides the advantage of ensuring that the clamping means cannot damage the surface of the refrigerator shelf.

Said upper jaw member is configured to engage the forward lip of said refrigerator shelf without contacting the upper surface of the refrigerator shelf.

This provides the advantage that the bracket does not have to be removed to enable the flat surface of the shelf to be removed for cleaning.

In a preferred embodiment, said clamping means defines respective receiving portions formed in said upper and lower arms to house a nut and a bolt.

In a preferred embodiment, said clamping means further comprises:

a nut disposed in one of the upper and lower arms; and a bolt projecting through a hole disposed in the other of said lower and upper arms, wherein said hole is positioned to enable said bolt to be screwed into said nut to draw the upper and lower arms together.

This provides the advantage of a reliable mechanism for clamping the jaws of the bracket together whilst making no contact with the surface of the refrigerator shelf.

In a preferred embodiment, said bolt makes no contact with said refrigerator shelf.

This provides the advantage of ensuring that the bolt cannot damage the surface of the refrigerator shelf.

Preferred embodiments of the present invention will now be described, by way of example only, and not in any limitative sense, with reference to the accompanying drawings in which.

Figure 1:
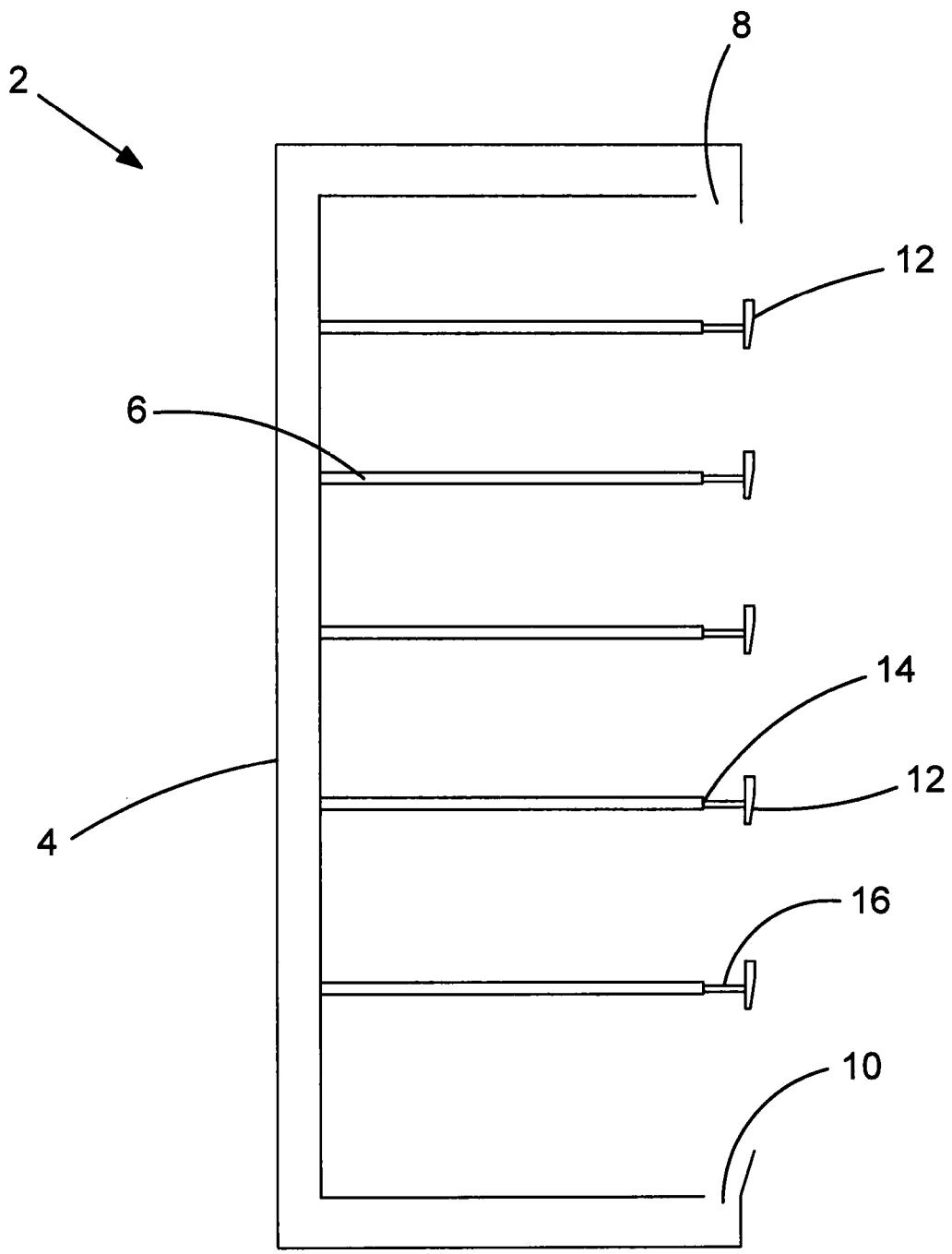
FIG. 1 is a schematic cross-section of an open-fronted refrigerator having aerofoils attached to each shelf to retain an air curtain.
Figure 2:
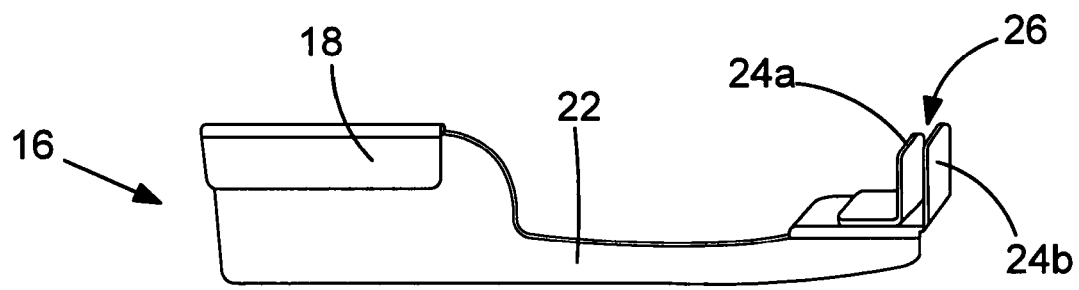
FIG. 2 is a perspective view of a prior art clamp for holding an aerofoil in position in front of a refrigerator shelf.
Figure 3:
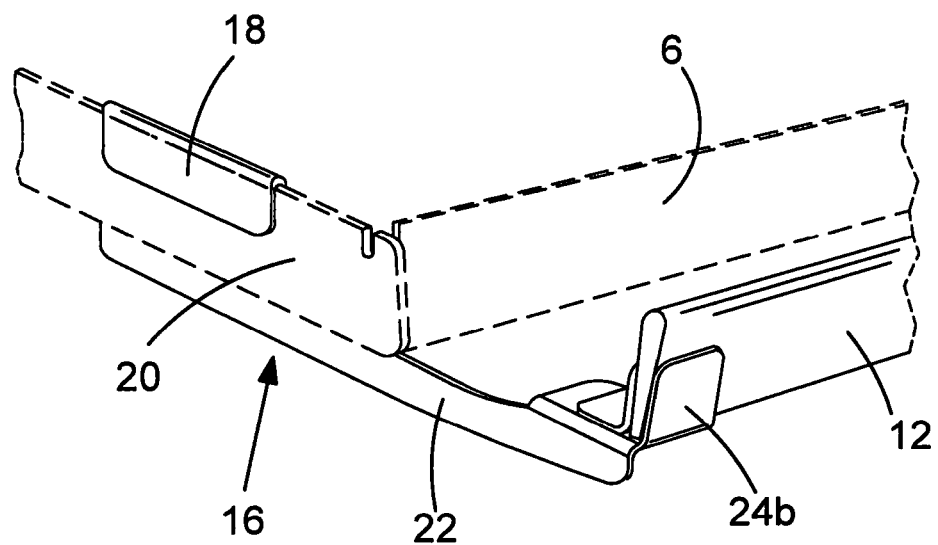
FIG. 3 is a perspective view of the clamp of FIG. 2 installed on a refrigerator shelf and holding an aerofoil.
Figure 4:
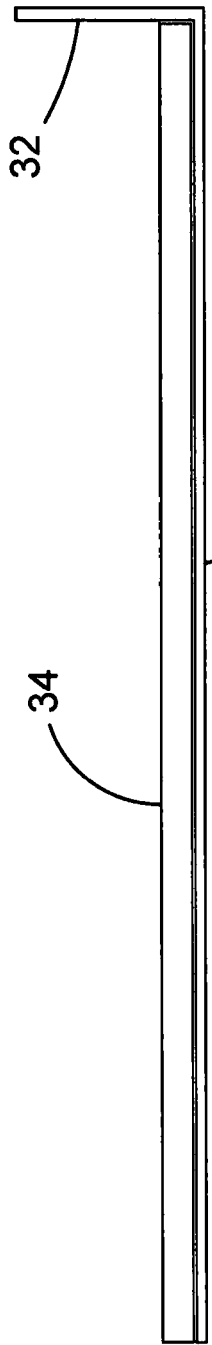
FIG. 4 is a cross-sectional view of a refrigerator shelf having a front lip and a glass or acrylic glass sheet installed on the shelf.
Figure 5:
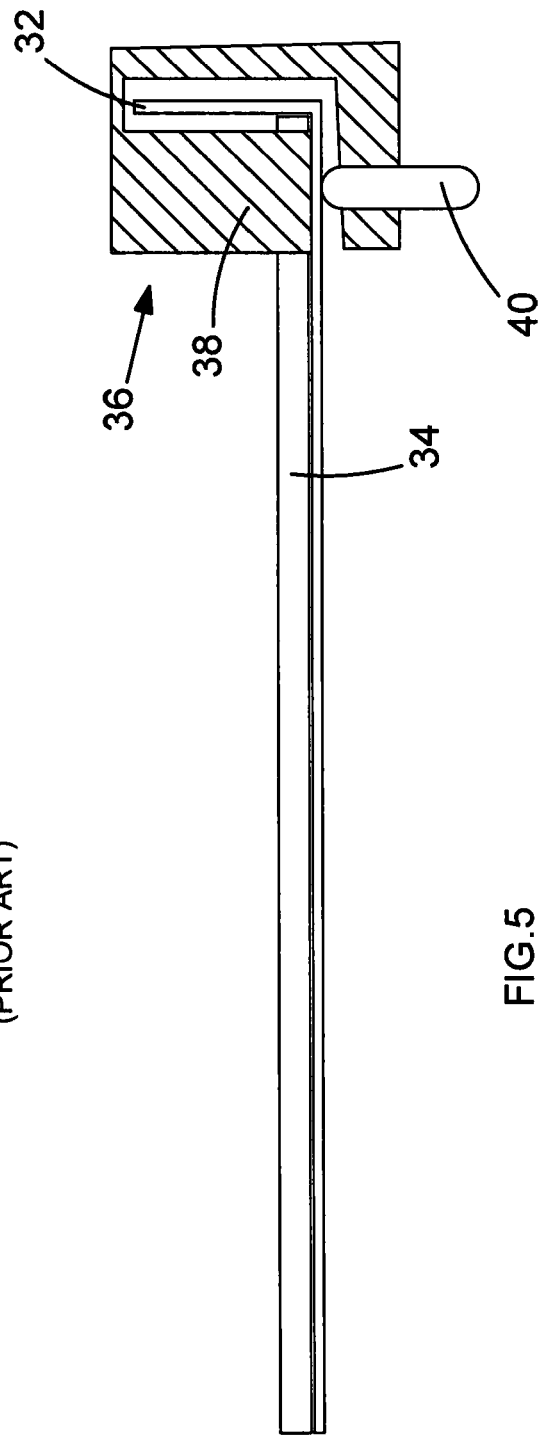
FIG. 5 is a cross-sectional schematic view of a prior art clamp used to attach an aerofoil to the front of the shelf of FIG. 4.
Figure 6:
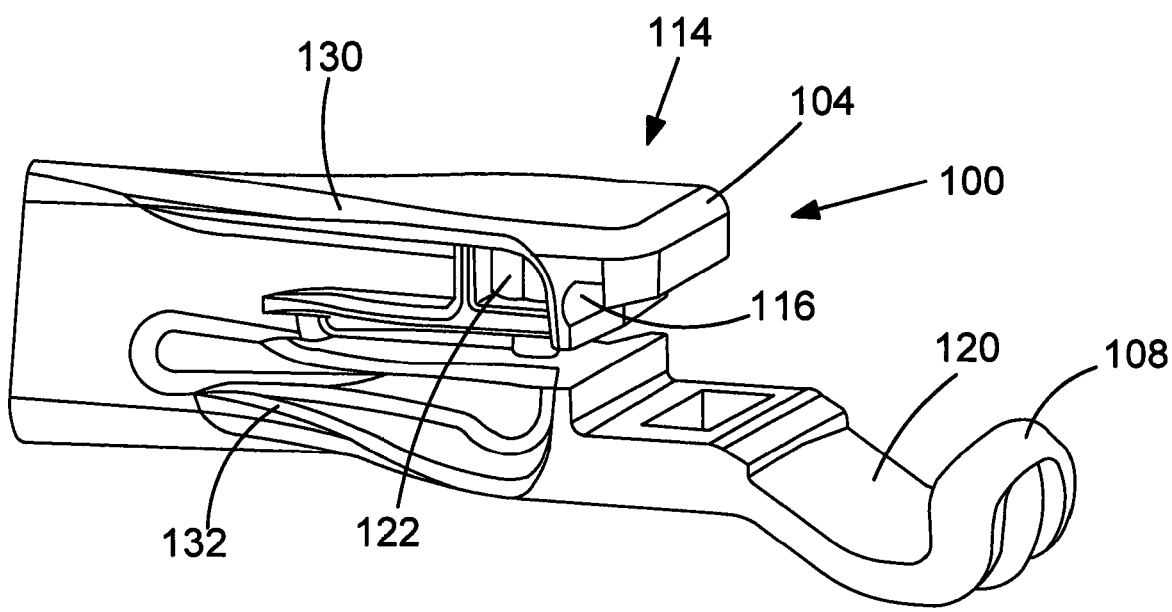
FIG. 6 is a perspective view of a bracket for clamping an aerofoil to a shelf of a refrigerator in accordance with a first embodiment of the invention.
Figure 7:
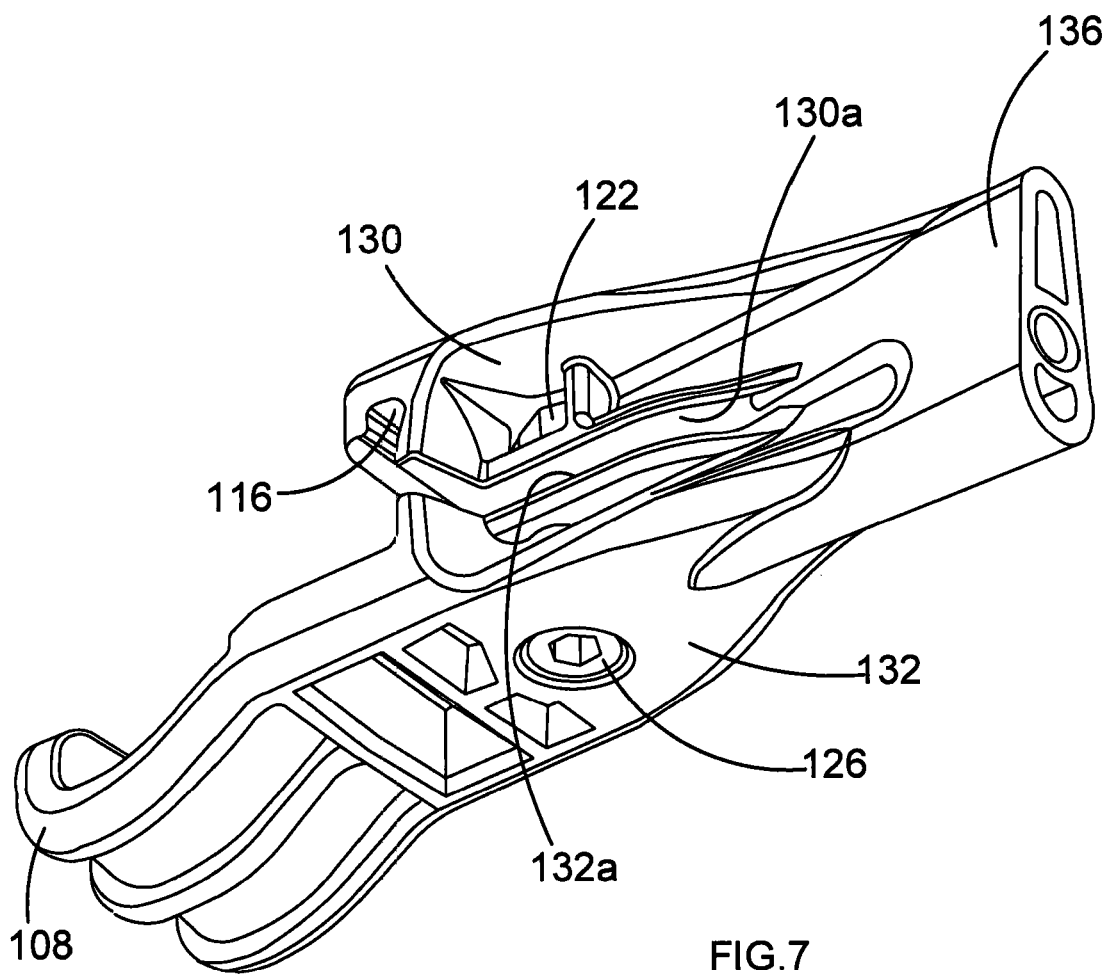
FIG. 7 is a perspective view from below of the bracket of FIG. 6.

Referring to FIGS. 6 to 10, a bracket 100 for clamping an aerofoil to a shelf 102 of a refrigerator comprises a mounting portion for holding part of an aerofoil in use. The mounting portion may for example be identical to that shown in FIGS. 2 and 3 which uses two projections 24a and 24b at the end of an arm 22 to define a channel 26 in which aerofoil 12 sits.

The bracket 100 comprises a mounting portion (not shown) supported by an arm portion 136. Arm portion 136 bifurcates into upper and lower arms 130 and 132 which define an elongate channel 134 therebetween. Parallel surfaces 130a and 132a of the upper and lower arms 130 and 132 define the sides of elongate channel 134. However, other configurations are possible in which the surfaces 130a and 132a are not parallel. Elongate channel 134 permits the upper and lower arms 130 and 132 to move towards and away from one another. An upper jaw 104 at the end of upper arm 130 is configured to engage the forward lip 106 of shelf 102. Upper jaw 134 comprises a recess 116 for receiving the forward lip 106 of shelf 102. A lower jaw member 108 at the end of lower arm 132 is configured to engage a lower lip 112 on the underside 110 of refrigerator shelf 102.

It can be seen that the upper jaw member 104 is dimensioned such that its forward end 118 does not engage the upper surface of shelf 102. This prevents damage to the shelf 102 from over-tightening. Lower jaw member 108 defines a larger recess 120 which can grip the lower lip 112 of shelf 102.

Figure 8:
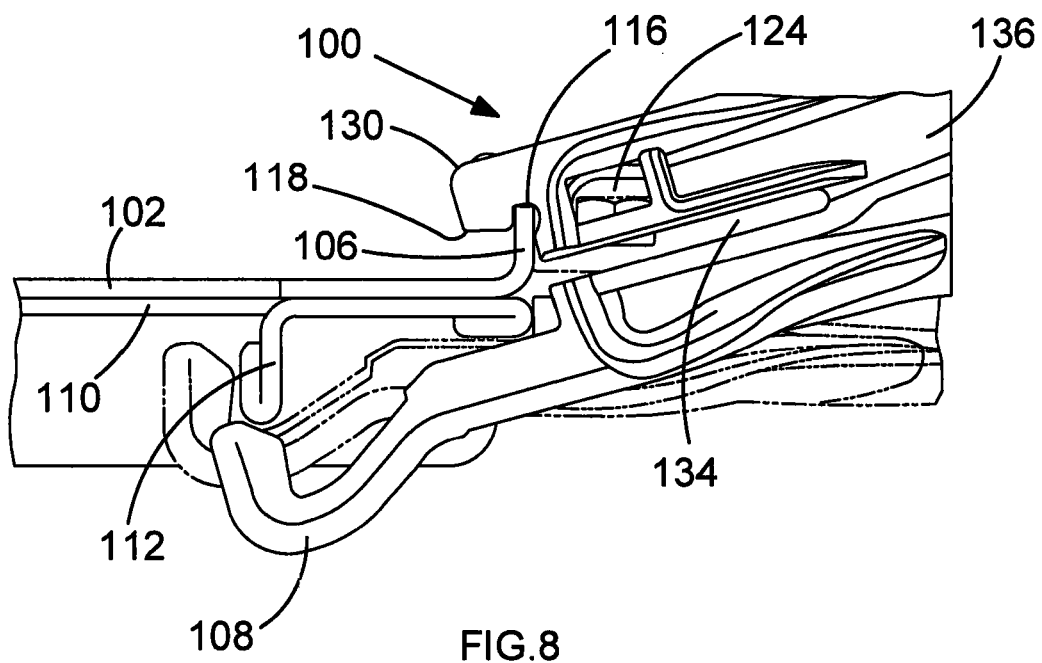
FIG. 8 is a side view of the bracket of FIG. 6 in two positions during mounting to a shelf.
Figure 9:
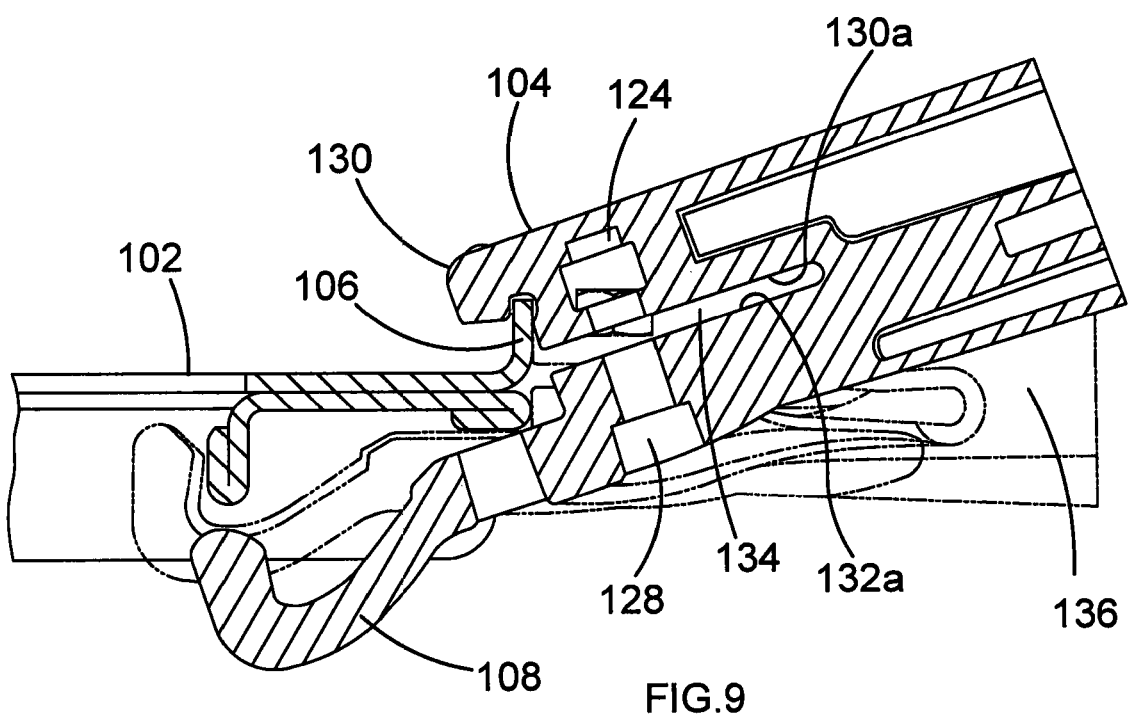
FIG. 9 is a cross-sectional view corresponding to FIG. 8.
Figure 10:
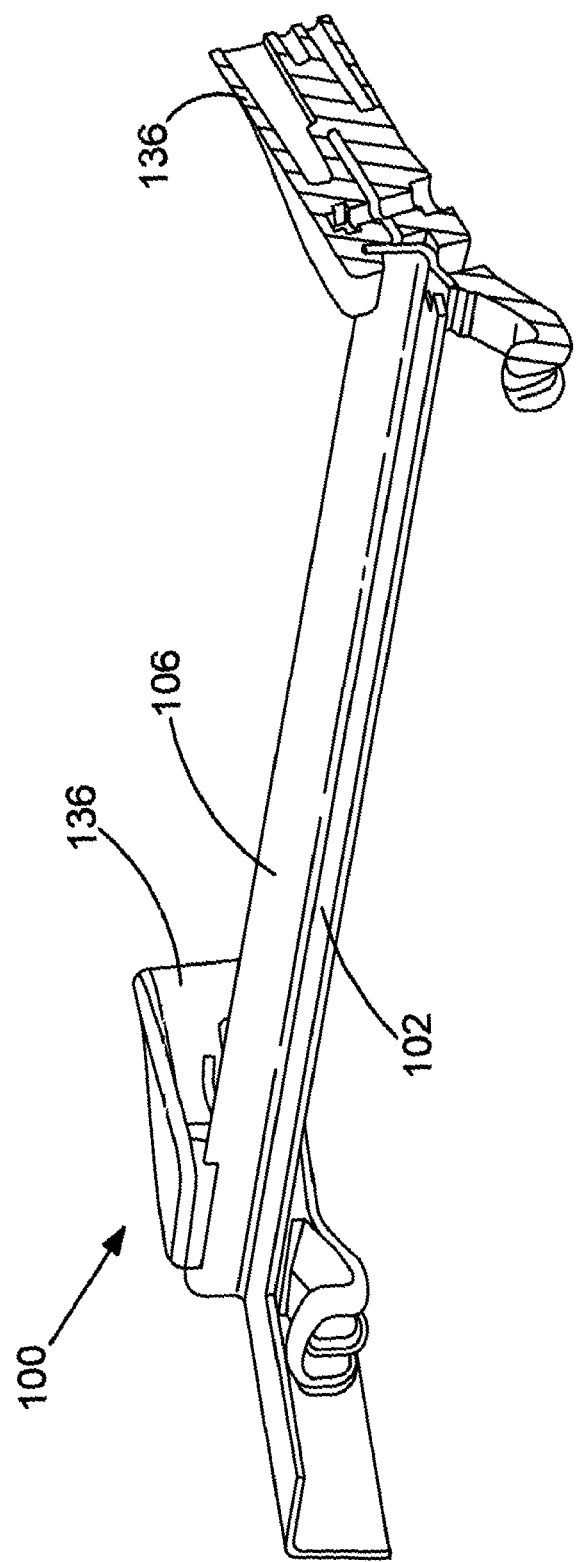
FIG. 10 is a view of two brackets of FIG. 6 in partial cross-section shown attached to the front end of a refrigerator shelf.
Figure 11:
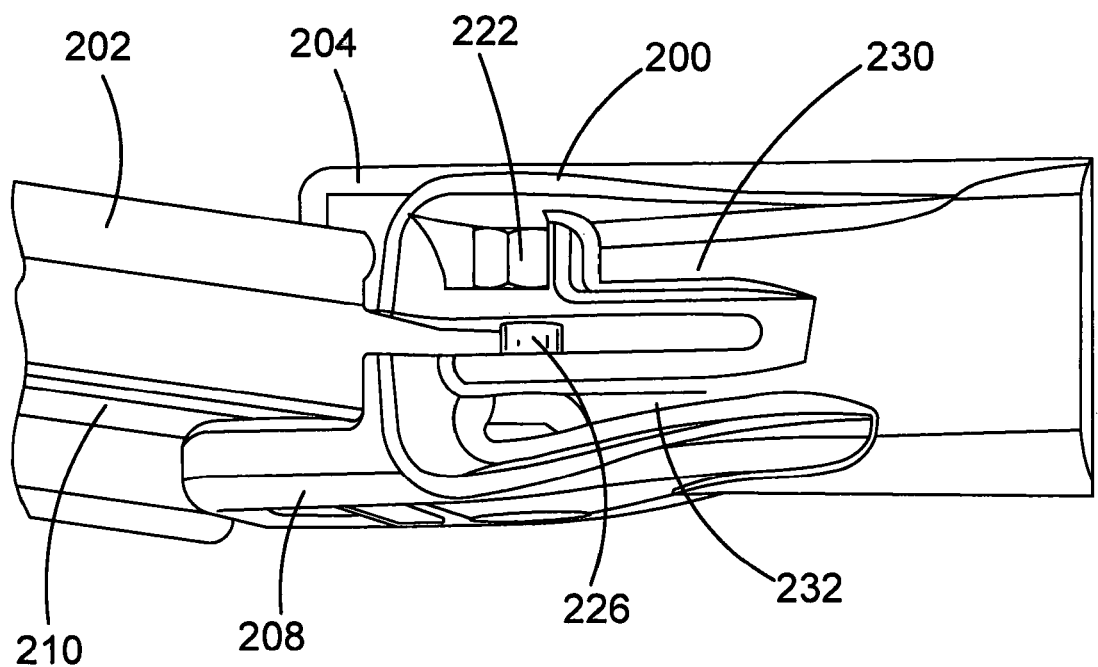
FIG. 11 is a side perspective view of a bracket for clamping an aerofoil to a shelf of a refrigerator in accordance with a second embodiment of the invention.
Figure 12:
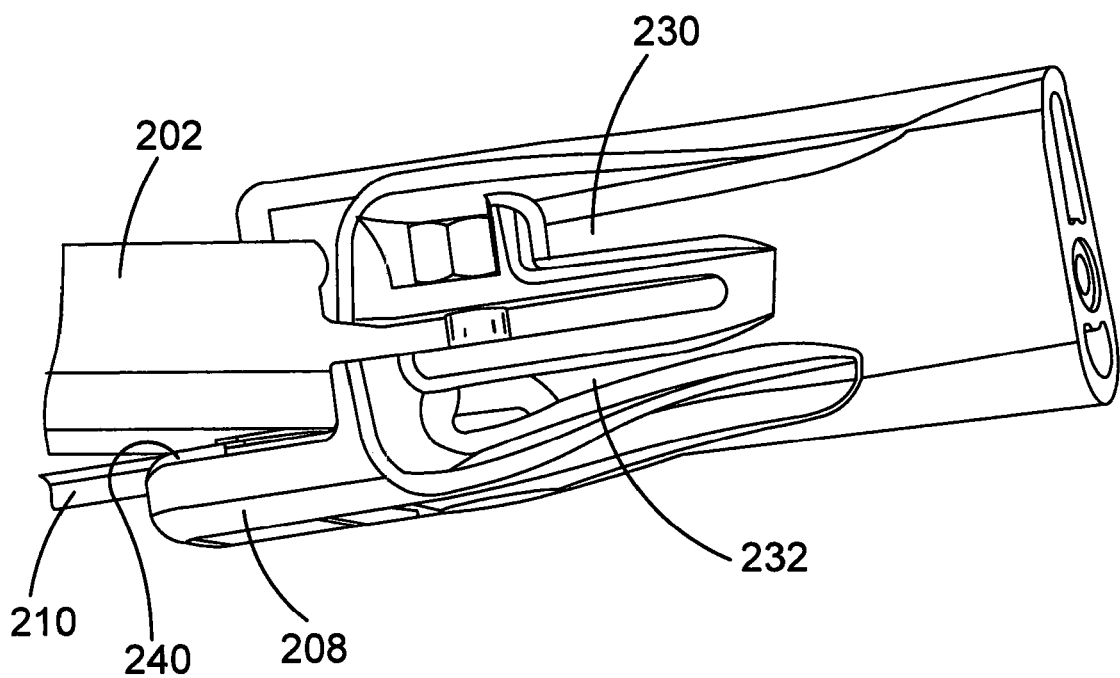
FIG. 12 is a perspective view of the bracket of FIG. 11 shown partially clamped to a refrigerator shelf.
Figure 13:
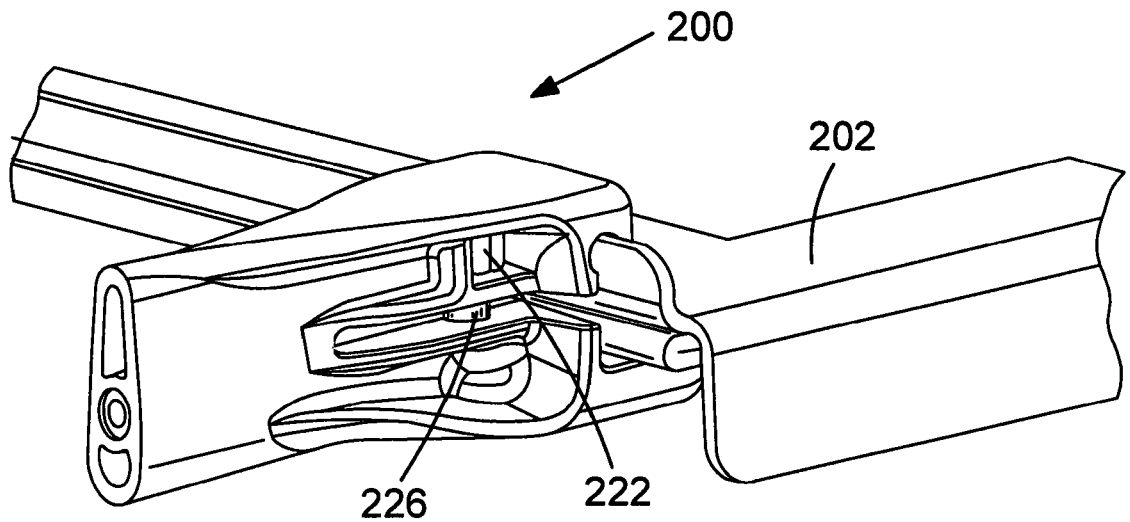
FIG. 13 is a perspective view of the bracket of FIG. 11 from the other side of FIG. 12.
Figure 14:
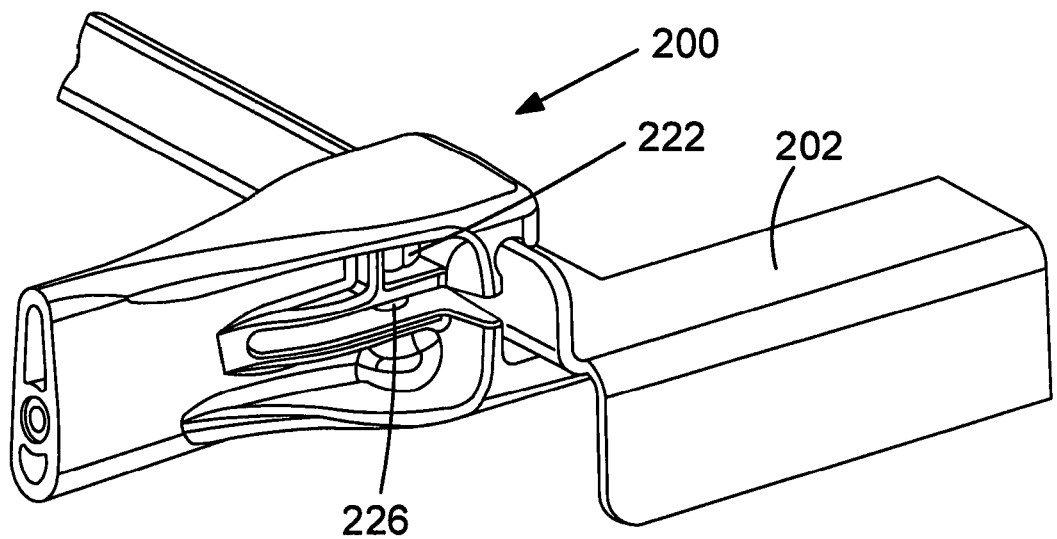
FIG. 14 is a perspective view corresponding to FIG. 13 in which the clamping means is tightened.

Referring to FIGS. 8 and 9, to mount the bracket 100 to a refrigerator shelf 102, the user locates forward lip 106 of shelf 102 in recess 116 of upper jaw 130 at the same time, the lower jaw 108 is located on the underside 110 of shelf 102. The user then pulls downwardly on arm portion 136 which causes lower jaw 108 to hook under lower lip 112 of shelf 102. The channel 134 allows the upper and lower arms 130 and 132 to move relative to one another and cavity 134 to facilitate deformation and enable the bracket 100 to be moved into full engagement with the shelf 102.

The bracket 100 may be formed from a resilient material to facilitate flexing of upper and lower arms 130 and 132. This resilient material therefore results in a snap-fitting motion when the user pulls arm 136 downwardly in the positions of FIGS. 8 and 9. The bracket 100 may be formed from a single moulded piece of thermoplastic to provide the resilient properties. For example, acetal may be used.

It can be seen that in the unflexed condition, arms 130 and 132 and therefore surfaces 130a and 132a are substantially parallel to one another. This configuration of elongate arms and cavity 134 has been found to provide the best configuration to facilitate snap-fitting.

The bracket 100 may also comprise alternative clamping means shown generally by 114 configured to enable the upper and lower arms 130 and 132 to be drawn together to tighten upper jaw member 104 and lower jaw member 108 to clamp the bracket 100 on the refrigerator shelf 102. Clamping may be desirable for heavier aerofoils and also to prevent vibration. This configuration of bracket 100 may be formed from a single piece of moulded material which prevents the user having to awkwardly attach several different parts together onto a refrigerator shelf.

The clamping means 114 comprises respective receiving portions formed in the upper 130 and lower arms 132 to house a nut 122 and a bolt 124. In particular, nut 122 is held captive in an aperture 124 and a bolt 126 disposed in hole 128 in a position which the bolt 126 can be screwed into nut 122. When the bolt 126 is tightened into nut 122, the upper and lower arms 130 and 132 and therefore upper and lower jaw members are drawn together to clamp on the front end of shelf 102. In the embodiment shown, the nut is tightened with a hex key, although any head type such as flat head or Philips can be used. Also, the bracket 100 can be supplied without the nut and bolt mounted in the receiving portions to simplify mounting to a shelf. Once mounted, the nut and bolt can then be inserted for tightening.

Referring to FIGS. 11 to 14, a second embodiment of the invention is described which is more suitable for clamping to a shelf 202 having a flat underside 210. Bracket 200 comprises upper and lower jaw members 204 and 208 attached to upper and lower arm members 230 and 232. The clamping means also comprises a nut 222 and bolt 226 used in the same manner as the first embodiment of FIGS. 6 to 10. However, the lower jaw member 208 in this embodiment comprises a flat contact surface 240 for direct engagement with the flat underside 210 of shelf 202.

It will be appreciated by persons skilled in the art that the above embodiments have been described by way of example only and not in any limitative sense, and that various alterations and modifications are possible without departure from the scope of the invention as defined by the appended claims.

The invention claimed is:

1. A bracket for clamping an aerofoil to a shelf of a refrigerator, the bracket comprising:
   an arm portion for supporting a mounting portion for holding part of an aerofoil in use, wherein the arm portion bifurcates into an upper arm and a lower arm defining an elongate channel therebetween, the elongate channel permitting the upper and lower arms to move towards and away from one another;
   an upper jaw member formed at an end of the upper arm, the upper jaw member defining a recess to receive the forward lip of a refrigerator shelf in use; and
   a lower jaw member formed at an end of the lower arm, the lower jaw member configured to engage an underside of said refrigerator shelf or a lower lip of said refrigerator shelf;
   wherein the upper arm and lower arm define the elongate channel between substantially parallel surfaces of the upper arm and lower arm, and wherein the distance between said substantially parallel surfaces is constant along the entire length of the elongate channel in the undeformed condition of the bracket.

2. A bracket according to claim 1, wherein the upper arm and lower arm are formed from a resilient material to facilitate flexing of the upper and lower arms to enable the upper and lower jaw members to be snap-fit onto said refrigerator shelf in use.

3. A bracket according to claim 1, wherein the bracket is formed from a single piece of thermoplastic.

4. A bracket according to claim 1, further comprising clamping means configured to enable the upper and lower arms to be drawn towards one another to clamp the bracket on said refrigerator shelf.

5. A bracket according to claim 4, wherein the clamping means makes no contact with said refrigerator shelf.

6. A bracket according to claim 1, wherein said upper jaw member is configured to engage the forward lip of said refrigerator shelf without contacting the upper surface of the refrigerator shelf.

7. A bracket according to claim 4, wherein said clamping means defines respective receiving portions formed in said upper and lower arms to house a nut and a bolt.

8. A bracket according to claim 7, wherein said clamping means further comprises:
   a nut disposed in one of the upper and lower arms; and
   a bolt projecting through a hole disposed in the other of said lower and upper arms, wherein said hole is positioned to enable said bolt to be screwed into said nut to draw the upper and lower arms together.

9. A bracket according to claim 8, wherein said bolt makes no contact with said refrigerator shelf.

* * * * *